(12) United States Patent
Kull et al.

(10) Patent No.: US 7,008,110 B2
(45) Date of Patent: Mar. 7, 2006

(54) HYDRODYNAMIC PIVOT BEARING

(75) Inventors: Andreas Kull, Donaueschingen (DE); Olaf Winterhalter, Epfendorf (DE); Joerg Hoffmann, Mettlach (DE); Martin Hafen, Spaichingen (DE)

(73) Assignee: Minebea Co., Ltd., (JP)

( * ) Notice: Subject to any disclaimer, the term of this patent is extended or adjusted under 35 U.S.C. 154(b) by 86 days.

(21) Appl. No.: 10/387,047

(22) Filed: Mar. 12, 2003

(65) Prior Publication Data

US 2003/0174914 A1    Sep. 18, 2003

Related U.S. Application Data

(60) Provisional application No. 60/363,784, filed on Mar. 12, 2002.

(51) Int. Cl.
*F16C 32/06* (2006.01)

(52) U.S. Cl. ......................... 384/107; 384/112

(58) Field of Classification Search ............... 384/100, 384/107, 108, 111–113, 121
See application file for complete search history.

(56) References Cited

U.S. PATENT DOCUMENTS

| | | | |
|---|---|---|---|
| 3,758,177 A * | 9/1973 | Williams | 384/113 |
| 4,346,946 A | 8/1982 | Maruyama | |
| 4,934,836 A | 6/1990 | Tanaka et al. | |
| 5,277,499 A * | 1/1994 | Kameyama | 384/123 |
| 5,667,309 A | 9/1997 | Nose | |
| 5,715,116 A * | 2/1998 | Moritan et al. | 360/99.08 |
| 5,770,906 A | 6/1998 | Hazelton et al. | |
| 5,947,608 A | 9/1999 | Kim | |
| 6,040,648 A | 3/2000 | Kawawada et al. | |
| 6,271,612 B1 | 8/2001 | Tanaka et al. | |
| 6,316,856 B1 * | 11/2001 | Kusaki et al. | 310/90 |
| 6,371,650 B1 | 4/2002 | Goto et al. | |

FOREIGN PATENT DOCUMENTS

| | | |
|---|---|---|
| DE | 2815009 | 10/1979 |
| JP | 07071448 | 3/1995 |
| JP | 09219952 A | 8/1997 |

* cited by examiner

*Primary Examiner*—Thomas R. Hannon
(74) *Attorney, Agent, or Firm*—Schulte Roth & Zabel, LLP; Joel E. Lutzker; Anna Vishev

(57) ABSTRACT

The present invention provides a bearing comprised of a hydrodynamic bearing and a pivot bearing, which can be used with a spindle motor. It also provides a spindle motor utilizing a hydrodynamic bearing and a pivot bearing.

5 Claims, 5 Drawing Sheets

HYDRODYNAMIC PIVOT BEARING

CROSS-REFERENCE TO RELATED APPLICATIONS

This application claims priority from Fed. Rep. Of Germany Patent Application Nos. DE10232933.8, filed on Jul. 19, 2002; DE10237848.7, filed on Aug. 19, 2002; and DE10240634, filed on Sep. 2, 2002; and from U.S. Provisional Patent Application Ser. No. 60/363,784, filed on Mar. 12, 2002.

BACKGROUND OF THE INVENTION

The following invention relates to electronic spindle motors of the type used in disk drives and in particular relates to improvements in fluid bearings for such motors.

Disc drive systems have been used in computers and other electronic devices for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

Electric spindle motors of the type used in disk drives conventionally rely on ball bearings to support a rotary member, such as a rotating hub, on a stationary member, such as a shaft. Ball bearings are wear parts and in time friction will cause failure of the motor. In addition, ball bearings create debris in the form of dust or fine particles that can find their way into "clean" chambers housing the rotary magnetic disks which are driven by the motor. The mechanical friction inherent in ball bearings also generates heat and noise, both of which are undesirable in a disk drive motor.

Fluid dynamic bearings represent a considerable improvement over conventional ball bearings in spindle drive motors. In these types of systems, lubricating fluid—either gas or liquid—functions as the actual bearing surface between a stationary base or housing in the rotating spindle or rotating hub of the motor. For example, liquid lubricants comprising oil, more complex ferro-magnetic fluids or even air have been utilized in hydrodynamic bearing systems.

SUMMARY OF THE INVENTION

It is an object of the present invention to provide a spindle motor with a fluid dynamic pivot bearing which saves run-current and, therefore, reduces power consumption of the spindle motor. The present inventions combines the benefit of increased stability provided by hydrodynamic bearings with the benefit of low power consumption provided by pivot bearings.

The above and other objects, aspects, features and advantages of the invention will be more readily apparent from the description of the preferred embodiments thereof taken in conjunction with the accompanying drawings.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Figure 1:
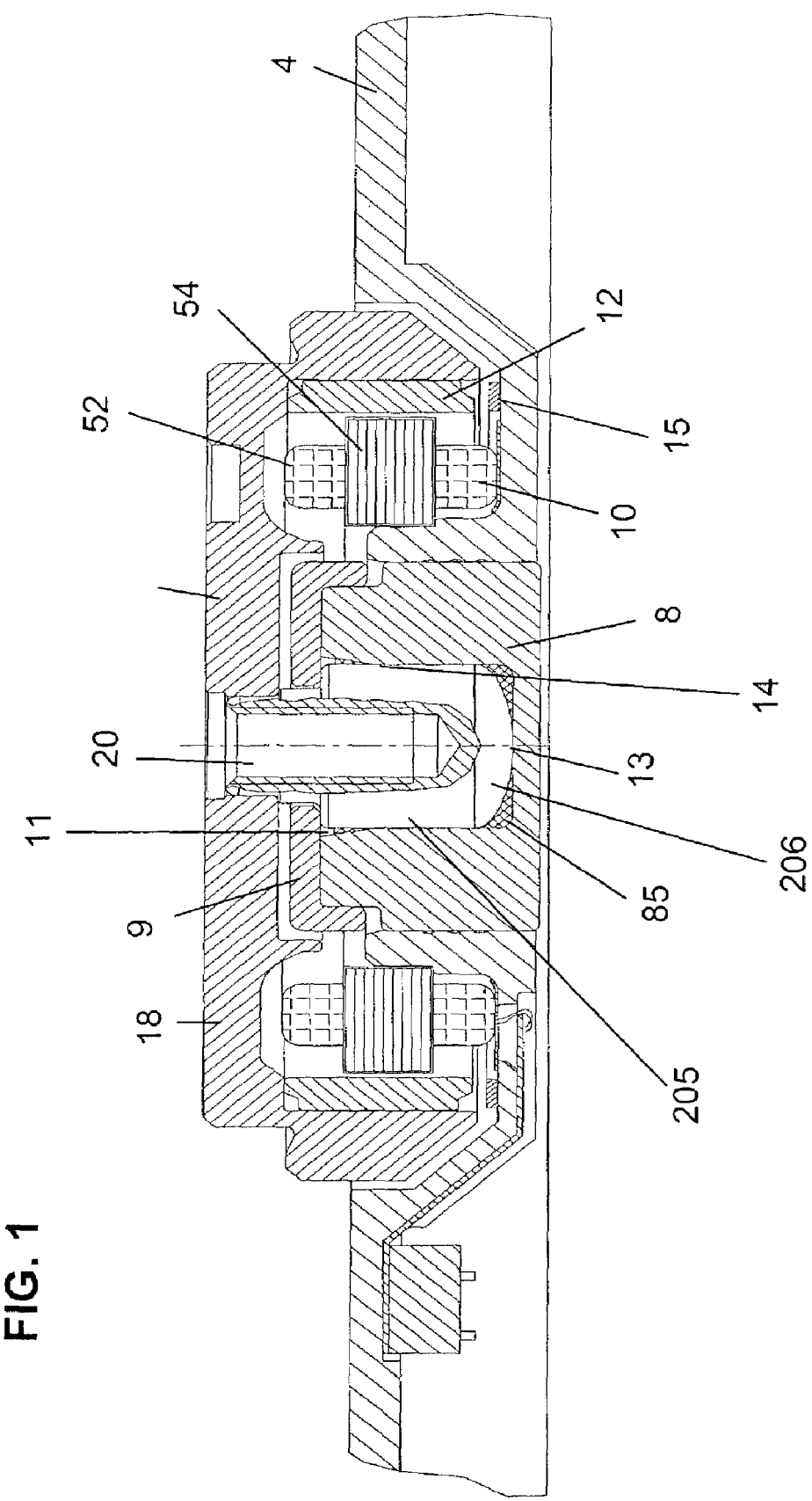
FIG. 1 is a is a side cut-away view of an electronic spindle motor having a rotational shaft, a magnetic shield, and a journal bearing according to the first embodiment of the present invention.

The first embodiment of the present invention is shown in FIG. 1. A spindle motor includes a stator 10 and a rotor 6 that is arranged for rotation relative to stator 10.

The rotor 6 comprises a rotor hub 18 and a tubular shaft 20 fixed coaxially to the rotor hub 18. A rotor magnet 12 is bonded to the inner side of a circumferential wall of the rotor hub 18. The outer side of the circumferential wall of the rotor hub 18 is shaped to hold a magnetic disk (not shown).

Stator 10 comprises bracket 4 which is to be mounted on a disk drive device (not shown); sleeve 8; core 52, which is fixedly mounted to bracket 4, and coils 54 wound on the core 52. Coils 54 are radially spaced by a small gap from and arranged opposite to the rotor magnet 12.

Sleeve 8 is a tubular member into which is formed a cylindrical hole 85. With the exception of its upper most portion, cylindrical hole 85 has a constant radius A. The uppermost portion of cylindrical hole 85 has a slightly increased radius to provide for a capillary seal 11. Cap 9 is affixed to the upper surface of sleeve 8. Cap 9 has an inner radius B that is less than the radius of cylindrical hole 85. The cap 9 prevents the shaft 20 from being dislodged from cylindrical hole 85 when the motor receives a physical shock.

Shaft 20 extends through hub 18 and cap 9 down into cylindrical hole 85. The portion of shaft 20 that is inserted into cylindrical hole 85 comprises an upper shaft section 205 and a lower shaft section 206. Upper shaft section 205 has a constant radius C that is greater than the inner radius B of the cap 9 and that is slightly less than the radius of cylindrical hole 85. Lower shaft section 206 is a contiguous with upper shaft section 205 and the radius of lower shaft section 206 decreases from the radius C of upper shaft section 205 to a radius of zero at the bottom of cylindrical hole 85. Hence lower shaft section 206 is in contact with sleeve 8 at a pivot point 13.

The gap comprised of the spaces between sleeve 8 and shaft 20 is filled with an appropriate lubricating fluid. Pressure generating grooves 14 are formed either onto the outer surface of upper shaft section 205 or onto the inner surface of sleeve 8 opposite to upper shaft section 205 so as to create a journal bearing. If necessary, a second set of grooves can be added to form a second journal bearing. Additionally, pressure generating grooves can be placed on the bottom of lower shaft section 206 or on the opposing surface of sleeve 8 to minimize material contact between the shaft 20 and the sleeve 8.

A magnetic shield 15 is attached to bracket 4. Magnetic shield 15 interacts with rotor magnet 12 to apply a downward force on rotor 6.

Figure 2:
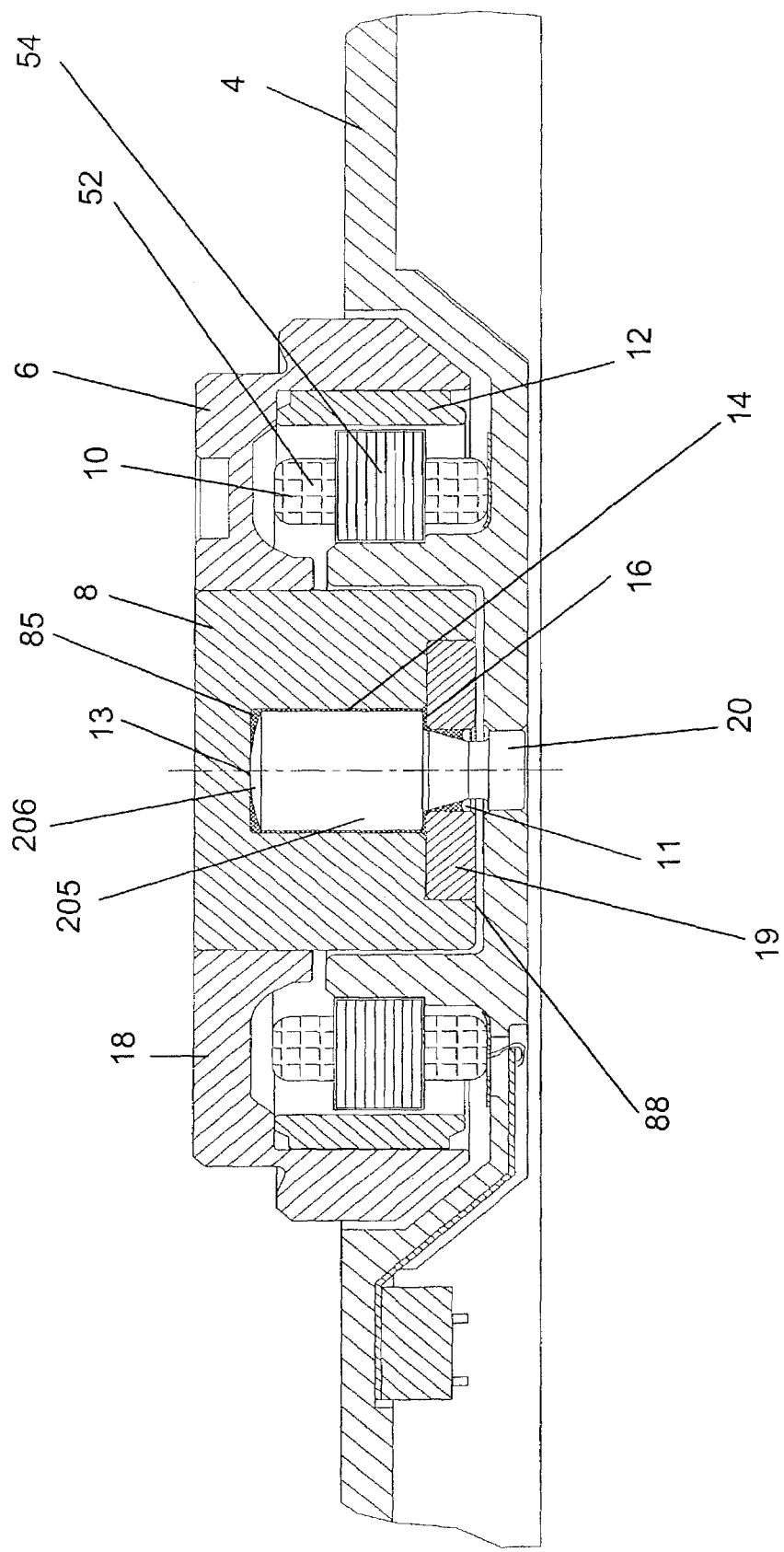
FIG. 2 is a side cut-away view of an electronic spindle motor having a fixed shaft, a journal bearing, a counterplate, and a thrust bearing according to the second embodiment of the present invention.
Figure 3:
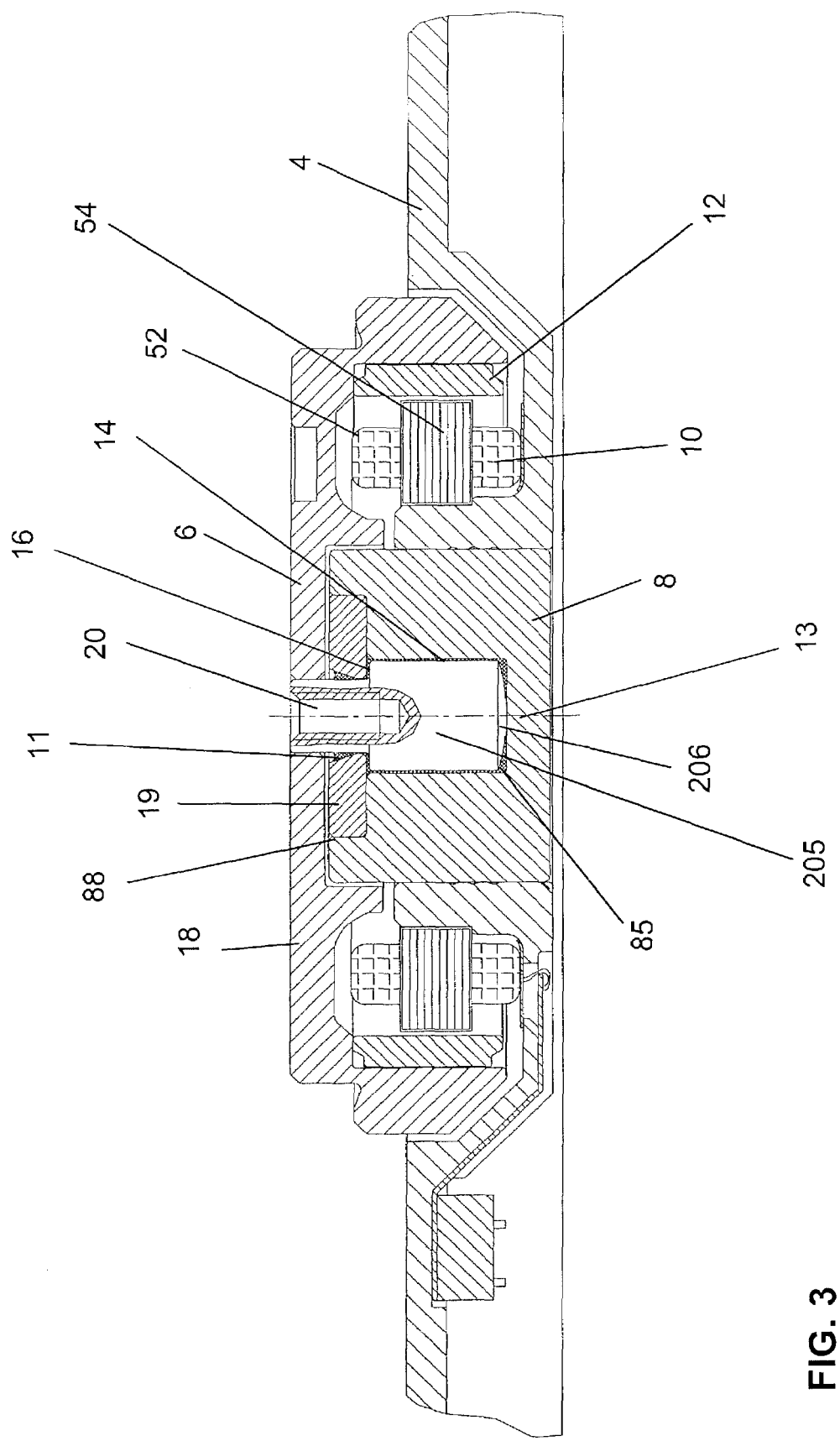
FIG. 3 is a side cut-away view of an electronic spindle motor having a rotational shaft, a journal bearing, a counterplate, and a thrust bearing according to the second embodiment of the present invention.

The second embodiment of the present invention is shown in FIG. 2 and in FIG. 3. The rotating shaft version of this spindle motor is shown in FIG. 3. A spindle motor includes a stator 10 and a rotor 6 that is arranged for rotation relative to stator 10.

The rotor 6 comprises a rotor hub 18 and a tubular shaft 20 fixed coaxially to the rotor hub 18. A rotor magnet 12 is bonded to the inner side of a circumferential wall of the rotor hub 18. The outer side of the circumferential wall of the rotor hub 18 is shaped to hold a magnetic disk (not shown).

Stator 10 comprises bracket 4 which is to be mounted on a disk drive device (not shown); sleeve 8; core 52, which is fixedly mounted to bracket 4, and coils 54 wound on the core 52. Coils 54 are radially spaced by a small gap from and arranged opposite to rotor magnet 12.

Sleeve 8 is a tubular member into which is formed a cylindrical hole 85. Cylindrical hole 85 has a constant radius A. Directly above cylindrical hole 85 and coaxial with cylindrical hole 85 is counterplate opening 88. Counterplate opening 88 extends from the top of cylindrical hole 85 to the upper surface of sleeve 8. Counterplate opening 88 has a constant radius B that is greater than the radius A of the cylindrical hole 85. Counterplate 19 is securely fit inside of counterplate opening 88. Counterplate 19 has an inner radius C that is less than the radius of cylindrical hole 85. The inner radius of counterplate 19 increases near the top of counterplate 19 to provide for capillary seal 11.

Shaft 20 extends through hub 18 and counterplate 19 down into cylindrical hole 85. The portion of shaft 20 that is inserted into cylindrical hole 85 comprises an upper shaft section 205 and a lower shaft section 206. Upper shaft section 205 has a constant radius C that is greater than the inner radius B of the counterplate 19 and that is slightly less than the radius A of cylindrical hole 85. Lower shaft section 206 is a contiguous with upper shaft section 205 and the radius of lower shaft section 206 decreases from the radius C of upper shaft section 205 to a radius of zero at the bottom of cylindrical hole 85. Hence lower shaft section 206 is in contact with sleeve 8 at a pivot point 13.

The gap comprised of the spaces between sleeve 8, counterplate 19 and shaft 20 is filled with an appropriate lubricating fluid. Pressure generating grooves 14 are formed either onto the outer surface of upper shaft section 205 or onto the inner surface of sleeve 8 opposite to upper shaft section 205 so as to create a journal bearing. If necessary, a second set of grooves can be added to form a second journal bearing. Pressure generating grooves 16 are formed either on the upper surface of upper shaft section 205 or on the opposing surface of counterplate 19 so as to create a thrust bearing. Additionally, pressure generating grooves may be placed on the bottom of lower shaft section 206 or on the opposing surface of sleeve 8 to minimize material contact between the shaft 20 and the sleeve 8.

The fixed shaft version the second embodiment is shown in FIG. 2. It includes a stator 10 and a rotor 6 that is arranged for rotation relative to stator 10.

The rotor 6 comprises a rotor hub 18 and sleeve 8 fixed coaxially to rotor hub 18. A rotor magnet 12 is bonded to the inner side of a circumferential wall of the rotor hub 18. The outer side of the circumferential wall of the rotor hub 18 is shaped to hold a magnetic disk (not shown).

Sleeve 8 is a tubular member into which is formed a cylindrical hole 85. Cylindrical hole 85 has a constant radius A. Directly below cylindrical hole 85 and coaxial with cylindrical hole 85 is counterplate opening 88. Counterplate opening 88 extends from the bottom of cylindrical hole 85 to the lower surface of sleeve 8. Counterplate opening 88 has a constant radius B that is greater than the radius A of the cylindrical hole 85. Counterplate 19 is securely fit inside of counterplate opening 88. Counterplate 19 has an inner radius C that is less than the radius of cylindrical hole 85. The radius of shaft 20 decreases near the bottom of counterplate 19 to provide for capillary seal 11.

Stator 10 comprises bracket 4, shaft 20, core 52 fixedly fitted to bracket 4; and coils 54 wound on the core 52. Stator 10 is radially spaced by a small gap from and arranged opposite to the rotor magnet 12.

Shaft 20 extends through hub 18 and counterplate 19 up into cylindrical hole 85. The portion of shaft 20 that is inserted into cylindrical hole 85 comprises an upper shaft section 205 and a lower shaft section 206. However, in this fixed shaft version of the second embodiment, upper shaft section 205 is physically below lower shaft section 206. Upper shaft section 205 has a constant radius C that is greater than the inner radius B of the counterplate 19 and that is slightly less than the radius A of cylindrical hole 85. Lower shaft section 206 is a contiguous with upper shaft section 205 and the radius of lower shaft section 206 decreases from the radius C of upper shaft section 205 to a radius of zero at the top of cylindrical hole 85. Hence lower shaft section 206 is in contact with sleeve 8 at a pivot point 13.

The gap comprised of the spaces between sleeve 8, counterplate 19 and shaft 20 is filled with an appropriate lubricating fluid. Pressure generating grooves 14 are formed either onto the outer surface of upper shaft section 205 or onto the inner surface of sleeve 8 opposite to upper shaft section 205 so as to create a journal bearing. If necessary, a second set of grooves can be added to form a second journal bearing. Pressure generating grooves 16 are formed either on the upper surface of upper shaft section 205 or on the opposing surface of counterplate 19 so as to create a thrust bearing. Additionally, pressure generating grooves may be placed on the top of lower shaft section 206 or on the opposing surface of sleeve 8 to minimize material contact between the shaft 20 and the sleeve 8.

Figure 4:
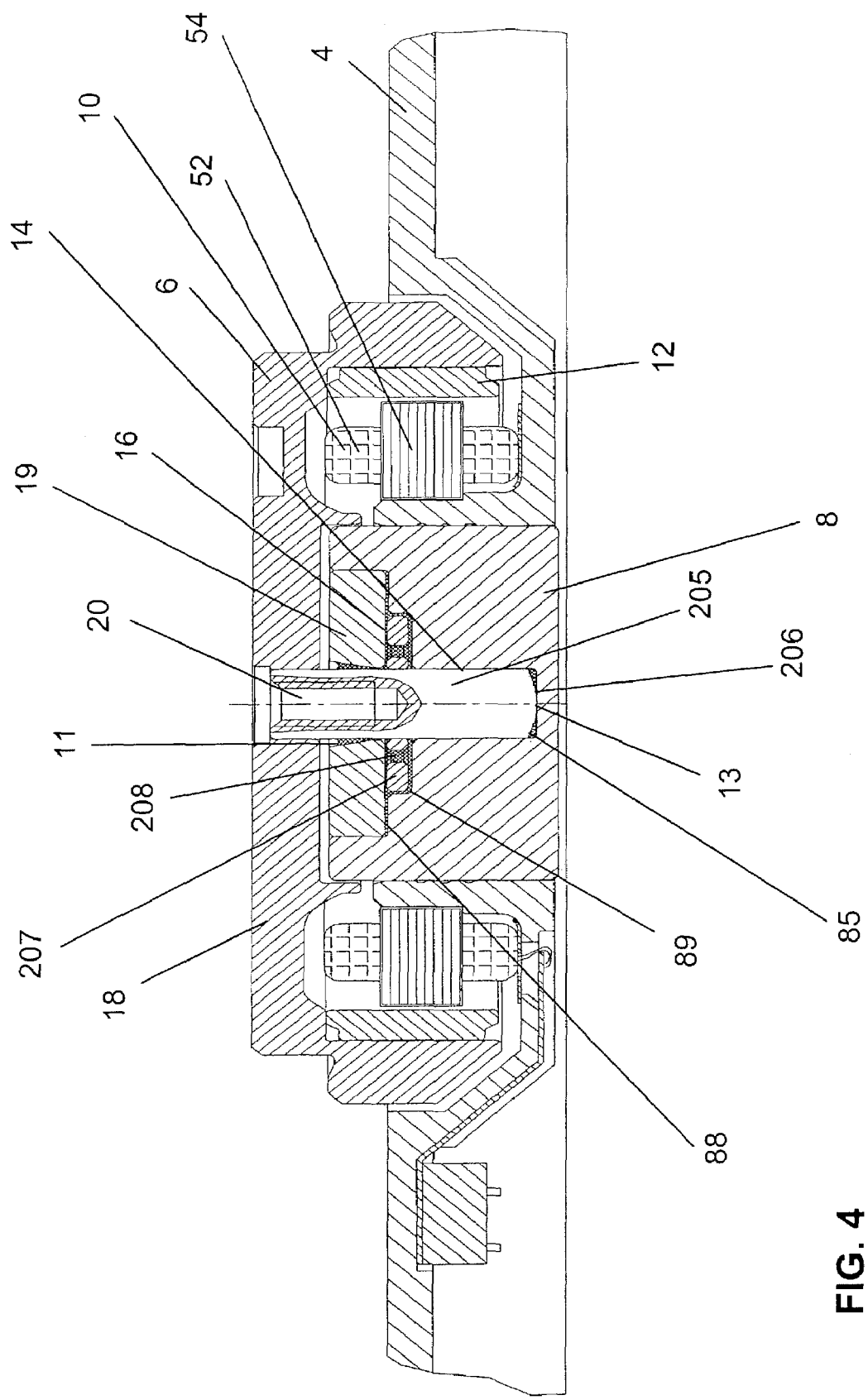
FIG. 4 is a side cut-away view of an electronic spindle motor having a rotational shaft, a thrust-washer, a journal bearing, a counterplate, and a thrust bearing according to the third embodiment of the present invention.
Figure 5:
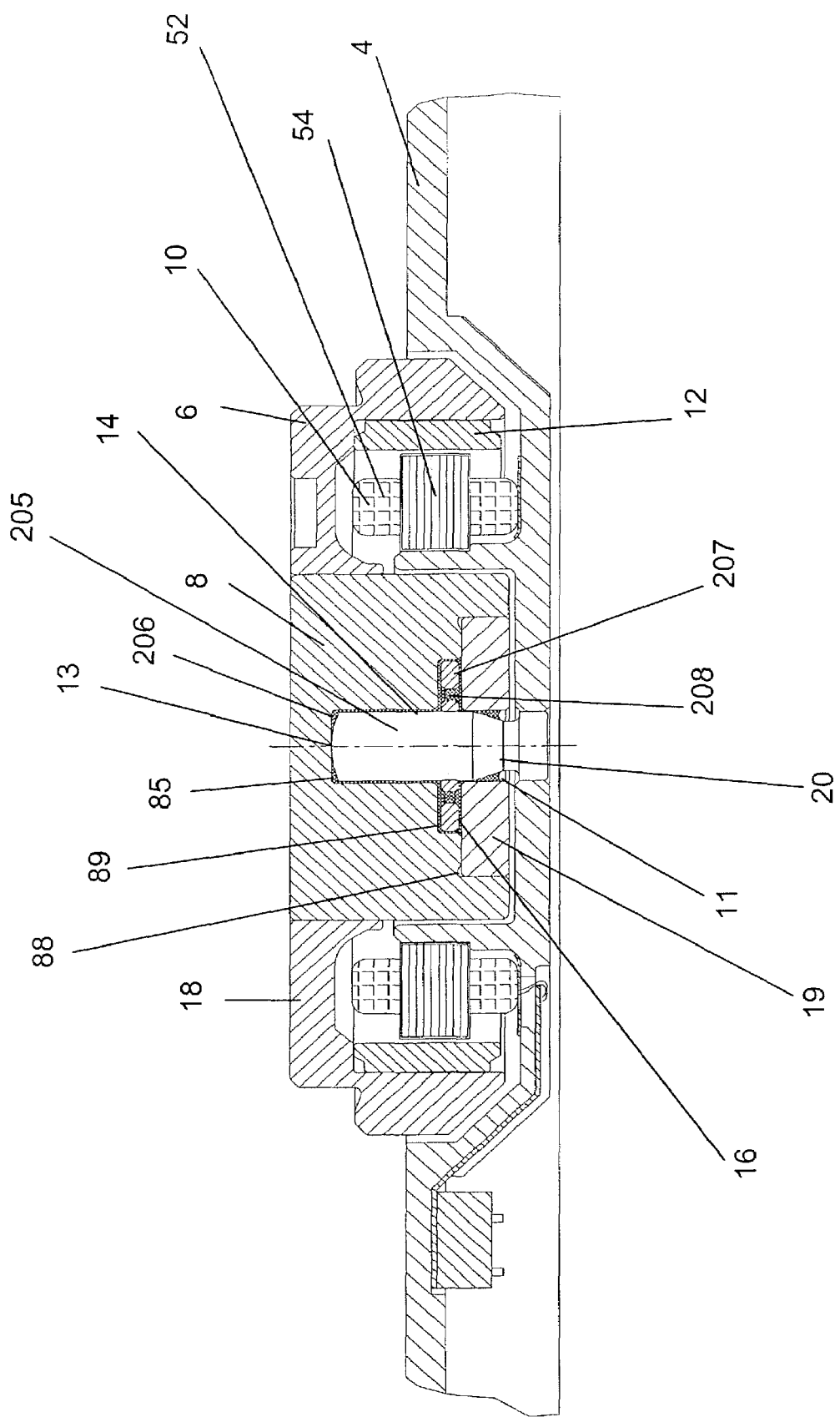
FIG. 5 is a side cut-away view of an electronic spindle motor having a fixed shaft, a thrust-washer, a journal bearing, a counterplate, and a thrust bearing according to the third embodiment of the present invention.

The third embodiment of the present invention is shown in FIG. 4 and in FIG. 5. The rotating shaft version of this spindle motor is shown in FIG. 4. It includes a stator 10 and a rotor 6 that is arranged for rotation relative to stator 10.

Rotor 6 comprises a rotor hub 18 and a tubular shaft 20 fixed coaxially to the rotor hub 18. A rotor magnet 12 is bonded to the inner side of a circumferential wall of the rotor hub 18. The outer side of the circumferential wall of the rotor hub 18 is shaped to hold a magnetic disk (not shown).

Stator 10 comprises bracket 4, which is to be mounted on a disk drive device (not shown); sleeve 8; core 52, which is fixedly mounted to bracket 4; and coils 54 wound on the core 52. Coils 54 are radially spaced by a small gap from and arranged opposite to the rotor magnet 12.

Sleeve 8 is a tubular member into which is formed a cylindrical hole 85. Cylindrical hole 85 has a constant radius A. Directly above cylindrical hole 85 and coaxial with cylindrical hole 85 is thrust-washer opening 89. Thrust-washer opening 89 has a constant radius D that is greater than the radius A of the cylindrical hole 85 Directly above thrust-washer opening 89 and coaxial with thrust-washer opening 89 is counterplate opening 88. Counterplate opening 88 extends from the top of thrust-washer opening 89 to the upper surface of sleeve 8. Counterplate opening 88 has a constant radius B that is greater than the radius D of thrust-washer opening 89. Counterplate 19 is securely fit inside of counterplate opening 88. Counterplate 19 has at its lowest point an inner radius C that is the same as the radius A of cylindrical hole 85. However, the inner radius of counterplate 19 increases near the top of counterplate 19 to provide for capillary seal 11.

Shaft 20 extends into sleeve 8 through hub 18, counterplate 19, thrust-washer opening 89, and cylindrical hole 85. The portion of shaft 20 that is inserted into sleeve 8 comprises an upper shaft section 205 and a lower shaft section 206. Upper shaft section 205 has a constant radius C that is less than the radius A of cylindrical hole 85. Lower shaft section 206 is a contiguous with upper shaft section 205 and the radius of lower shaft section 206 decreases from the radius C of upper shaft section 205 to a radius of zero at the bottom of cylindrical hole 85. Hence lower shaft section 206 is in contact with sleeve 8 at a pivot point 13. Thrust-washer 207 is fixedly attached to shaft 20. Thrust-washer 207 has an outer radius E that is slightly less than the radius of thrust-washer opening 89. Thrust-washer 207 contains a channel 208 that provides for the circulation of lubricating fluid. The distance between thrustwasher 207 and counterplate 19 is preferably between 4 and 7 microns. The distance between thrustwasher 207 and sleeve 8 is preferably 0.1 mm. Providing this relatively large diameter between the thrust-washer 207 and sleeve 8 reduces power consumption.

The gap comprised of the spaces between sleeve 8, counterplate 19, thrust-washer 207, and shaft 20 is filled with an appropriate lubricating fluid. Pressure generating grooves 14 are formed either onto the outer surface of upper shaft section 205 or onto the inner surface of sleeve 8 opposite to upper shaft section 205 so as to create a journal bearing. If necessary, a second set of grooves can be added to form a second journal bearing. Pressure generating grooves 16 are formed either on the upper surface of thrust-washer 207 or on the opposing surface of counterplate 19 so as to create a thrust bearing. Additionally, pressure generating grooves may be placed on the bottom of lower shaft section 206 or on the opposing surface of sleeve 8 to minimize material contact between the shaft 20 and the sleeve 8.

The fixed shaft version the third embodiment is shown in FIG. 5. It includes a stator 10 and a rotor 6 that is arranged for rotation relative to stator 10.

Rotor 6 comprises a rotor hub 18 and sleeve 8 fixed coaxially to the rotor hub 18. A rotor magnet 12 is bonded to the inner side of a circumferential wall of the rotor hub 18. The outer side of the circumferential wall of the rotor hub 18 is shaped to hold a magnetic disk (not shown).

Sleeve 8 is a tubular member into which is formed a cylindrical hole 85. Cylindrical hole 85 has a constant radius A. Directly below cylindrical hole 85 and coaxial with cylindrical hole 85 is thrust-washer opening 89. Thrust-washer opening 89 has a constant radius D that is greater than the radius A of the cylindrical hole 85 Directly below thrust-washer opening 89 and coaxial with thrust-washer opening 89 is counterplate opening 88. Counterplate opening 88 extends from the bottom of thrust-washer opening 89 to the lower surface of sleeve 8. Counterplate opening 88 has a constant radius B that is greater than the radius D of thrust-washer opening 89. Counterplate 19 is securely fixed inside of counterplate opening 88. Counterplate 19 has at its highest point an inner radius C that is the same as the radius A of cylindrical hole 85. However, the radius of shaft 20 decreases near the bottom of counterplate 19 to provide for capillary seal 11.

Stator 10 comprises bracket 4; shaft 20; core 52, which is fixedly mounted to bracket 4; and coils 54 wound on the core 52. Coils 54 are radially spaced by a small gap from and arranged opposite to the rotor magnet 12.

Shaft 20 extends into sleeve 8 through hub 18, counterplate 19, thrust-washer opening 89, and cylindrical hole 85. The portion of shaft 20 that is inserted into sleeve 8 comprises an upper shaft section 205 and a lower shaft section 206. However, in this fixed shaft version of the third embodiment, upper shaft section 205 is physically below lower shaft section 206. Upper shaft section 205 has a constant radius C that is less than the radius A of cylindrical hole 85. Lower shaft section 206 is a contiguous with upper shaft section 205 and the radius of lower shaft section 206 decreases from the radius C of upper shaft section 205 to a radius of zero at the top of cylindrical hole 85. Hence lower shaft section 206 is in contact with sleeve 8 at a pivot point 13. Thrust-washer 207 is fixedly attached to shaft 20. Thrust-washer 207 has an outer radius E that is slightly less than the radius of thrust-washer opening 89. Thrust-washer 207 contains a channel 208 that provides for the circulation of lubricating fluid. The distance between thrustwasher 207 and counterplate 19 is preferably between 4 and 7 microns. The distance between thrustwasher 207 and sleeve 8 is preferably 0.1 mm. Providing this relatively large diameter between the thrust-washer 207 and sleeve 8 reduces power consumption.

The gap comprised of the spaces between sleeve 8, counterplate 19, thrust-washer 207, and shaft 20 is filled with an appropriate lubricating fluid. Pressure generating grooves 14 are formed either onto the outer surface of upper shaft section 205 or onto the inner surface of sleeve 8 opposite to upper shaft section 205 so as to create a journal bearing. If necessary, a second set of grooves can be added to form a second journal bearing. Pressure generating grooves 16 are formed either on the lower surface of thrust-washer 207 or on the opposing surface of counterplate 19 so as to create a thrust bearing. Additionally, pressure generating grooves may be placed on the top of lower shaft section 206 or on the opposing surface of sleeve 8 to minimize material contact between the shaft 20 and the sleeve 8.

What is claimed is:
1. A spindle motor comprising:
a stator;
a rotor;
a pivot bearing;
a fluid dynamic journal bearing;
a counter-plate;
a fluid dynamic thrust bearing;
wherein said stator comprises a bracket, a sleeve affixed to said bracket, a core affixed to said bracket, and coils wound around said core;
said rotor comprises a shaft, a rotating hub, and a rotor magnet;
said pivot bearing comprises a pivot point at an end of said shaft rotating on said sleeve;

said fluid dynamic journal bearing comprises said shaft, said sleeve, a fluid, and pressure generating grooves formed on a vertical surface of one of said shaft and said sleeve;

said counter plate is affixed to said sleeve and positioned partially over said shaft; and said fluid dynamic thrust bearing comprises said shaft, said counter-plate, said fluid, and pressure generating grooves formed on a horizontal surface of one of said shaft and said counter-plate.

2. A spindle motor comprising:

a stator;

a rotor;

a pivot bearing;

a fluid dynamic journal bearing;

a counter-plate;

a fluid dynamic thrust bearing;

wherein said stator comprises a bracket, a shaft affixed to said bracket, a core affixed to said bracket, and coils wound around said core;

said rotor comprises a sleeve, a rotating hub affixed to said sleeve, and a rotor magnet affixed to said hub;

said pivot bearing comprises said sleeve rotating on a pivot point at an end of said shaft;

said fluid dynamic journal bearing comprises said shaft, said sleeve, a fluid, and pressure generating grooves formed on a vertical surface of one of said shaft and said sleeve;

said counter plate is affixed to said sleeve and positioned partially under said shaft; and said fluid dynamic thrust bearing comprises said shaft, said counter-plate, said fluid, and pressure generating grooves formed on a horizontal surface of one of said shaft and said counter-plate.

3. A bearing for a spindle motor comprising a shaft;

a bearing sleeve surrounding the shaft at a small radial distance;

a counter-plate affixed to the bearing sleeve;

wherein said shaft has a rounded end, a large diameter portion, a small diameter portion, and a horizontal portion that is located at a boundary between the large diameter portion and the small diameter portion;

a fluid dynamic journal bearing is provided at the large diameter portion of said shaft;

a fluid dynamic thrust bearing is provided at the horizontal portion of said shaft;

a capillary seal is provided at the small diameter portion of said shaft; and a pivot bearing is provided at the rounded end of said shaft.

4. The bearing of claim 3 wherein:

the capillary seal is formed by tapering said small diameter portion of said shaft.

5. The bearing of claim 3 wherein:

the capillary seal is formed by increasing an inner radius of a portion of said counter-plate.

* * * * *